United States Patent Office 3,005,791
Patented Oct. 24, 1961

3,005,791
FLOORING MATERIALS
John W. Church, Newburgh, N.Y., assignor, by mesne assignments, to The Ruberoid Co., South Bound Brook, N.J., a corporation of New Jersey
Filed Sept. 18, 1957, Ser. No. 684,706
9 Claims. (Cl. 260—27)

This invention relates to compositions suitable for floor coverings and is herein described as embodied in what may be called:

(1) A grease-resistant asphalt tile, although the tile contains no asphalt, as covered by Federal Specification SS–T–307.

(2) A vinyl tile conforming to the Type I description under L–T–751.

Figure 1:
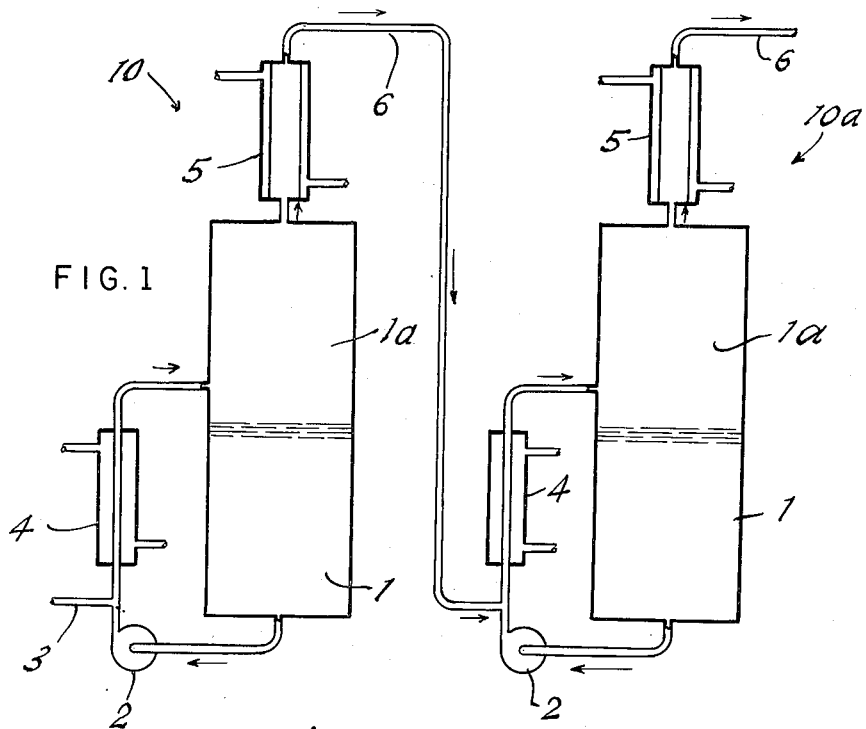
Figure 2:
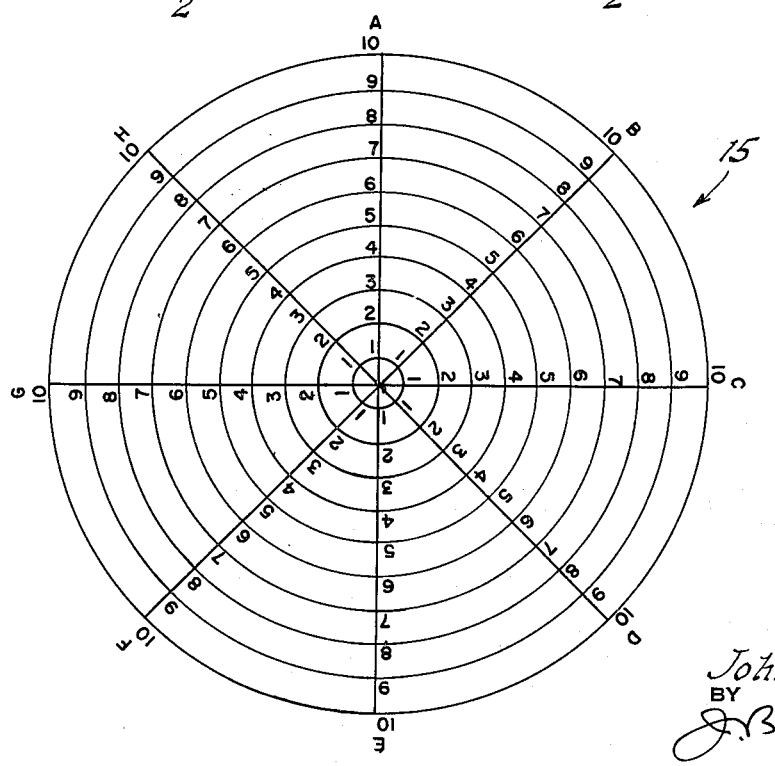

In the drawing FIG. 1 is a diagrammatic sketch of apparatus for carrying out the chlorination of paraffin; and FIG. 2 is a top plan view of a mold test transparency gauge.

In flooring compositions, great resistance is a highly desirable characteristic. Asphalt tile, as it is now made to conform to Federal Specfication SS–T–306b, is not made so as to be grease resistant. A limited amount of so-called asphalt tile is made to conform to the requirements of grease-resistant tile, Federal Specification SS–T–307. However, special synthetic resins, considerably more costly than those used in the SS–T–306b type, are required, and the cost of the resultant product is so high as to limit its use.

There are other forms of flooring compounds which are grease resistant, such as the vinyl tiles under Federal Specifications L–T–751 and certain linoxin or linoleum types, as well as certain types of vinyl compositions laminated to felt or other cellulosic backings. All of such other products, however, have disadvantages in one form or another, such as:

(a) High cost.

(b) Failure to pass the curling requirements of both SS–T–306b and SS–T–307.

I have discovered that an economical composition, made conforming to all the desirable characteristics of SS–T–307, may be produced by combining a certain type of chlorinated paraffin with a certain type of vinyl polymer or copolymer, to form an organic binder which has such high wetting power and, at the same time, such excellent grease resistance, that it may be combined with relatively large amounts of low-priced fillers, such as ground limestone, asbestos fibre and pigments for color, so as to give a highly serviceable, curlproof, grease resistant, flooring material.

This product may be formed in large sheets, or may be marketed in the form of tiles of any convenient size. It may also be produced in a variety of thicknesses. A typical composition of such a product is as follows:

EXAMPLE #1.—GREASE RESISTANT ASPHALT TILE

| | |
|---|---|
| P–45 chlorinated paraffin | 14.890 |
| Vinyl copolymer | 4.850 |
| Polymerized rosin | .875 |
| Stabilizer [1] | .260 |
| Ground limestone | 56.825 |
| 7R asbestos fibre | 19.300 |
| Pigment | 3.000 |
| | 100.000 |

[1] Such as epoxy resin, barium cadmium laureate, barium ricinoleate, and others.

The ingredients are placed together in an intensive internal mixer, such as a Banbury mixer or a Baker & Perkins mixer, and fluxed together by an intensive kneading action to form homogeneous masses of mixed materials. The masses are suitably sheeted out in manners well known to the art, such as being further incorporated on a two-roll mill, at which time marbleizing stock may or many not be added; and reducing to desired thickness by passing through a train of calender rolls, while being maintained at an elevated temperature suitable to produce ductility, and the required adhesion to the calender rolls. The finished sheet is partially cooled, and now may be cut into sheets or tiles of any required size, or rolled up into rolls. This is the typical and rather well-known, so-called "Asphalt Tile" process.

In most cases, the original calendered sheet is cut up immediately into tiles, and any border, as well as rejected tiles, are returned for reprocessing along with the new batch. The system is completely thermoplastic, and the product resoftens to workability as soon as its temperature is elevated to the desired point. In order that the finished composition may pass the grease-resistant properties of SS–T–307, as well as the other requirements, the selection of the ingredients used must be carefully made, and the processing conditions must also be carefully controlled.

This tile (3.08/1 ratio—P45/vinyl) gave the following test results, when tested in accordance with Federal Specification SS–T–307:

| | Sample Specimen | SS–T–307 Requirements |
|---|---|---|
| One-minute penetration (mils) | 9.4 | 6.0 to 15.0. |
| Ten-minute penetration (mils) | 14.7 | |
| Maximum allowed (mils) | 14.8 | 14.8. |
| Indentation at 115° F. (mils) | 32.0 | 36.0. |
| Impact | O.K. | Shall not crack or break. |
| Deflection | >2″ | Not less than .4″. |
| Curl | .015 | Not greater than .030. |
| Oil & Alkali Resistance [1] (Scratch width): | | |
| Control  Inches | .055 | |
| Lard  do | .125 | Not greater than .170 |
| Wesson Oil (hydrogenated cottonseed oil).[2]  do | .130 | Do. |
| Kerosene  do | .100 | Do. |
| 2% TSP  do | .055 | Do. |
| Size  do | 9.000 | MD[3]x8.992 to 9.008. 9.000 AMD.[4] |
| Thickness (Gauge)  do | ⅛″ (.125) | .120 to .130. |

[1] Covering both class 1 and class 2 oil and alkali resistance tests.
[2] Wesson Oil (hydrogenated cottonseed oil) used as a substitute for cottonseed oil.
[3] Machine direction.
[4] Against machine direction.

The chlorinated paraffin, which is not grease resistant in and of itself, is converted into a grease-resistant binder by complete and thorough solution in, and miscibility with, the vinyl copolymer. If, for any reason, the association is incomplete, or the two do not remain in complete miscibility with each other, and if the chlorinated paraffin tends to sweat or exude from the gelled mass obtained, then the grease-resistant properties will be found wanting.

It should be understood that paraffinic materials, in and of themselves, are not miscible nor compatible with vinyl polymers and copolymers in the ranges described herein. Only by careful chlorination of the paraffinic hydrocarbon to at least 45%, may the paraffin be rendered soluble in, and permanently miscible with, the vinyl polymer. Furthermore, if the chlorination is carried out in such a way that either:

(a) Portions of the paraffin are chlorinated to a low degree, even though the average chlorine content may be at the proper level, the chlorinated produce will take on the characteristics of the least chlorinated fraction, and, therefore, cause impermanent miscibility, with the resultant loss in grease-resistant properties; or still further, (b) If the chlorination is not controlled so that products of the proper composition are obtained, resulting in decomposition, then also will the product be lacking in merit.

A typical method for making the chlorinated paraffin noted above as P-45 is as follows:

A chlorination apparatus, such as shown in the attached drawing, is charged with a melted or liquid hydrocarbon, at a temperature of 80° C. Dry gaseous chlorine is closely associated with the entire mass of hydrocarbon by violent agitation of the hydrocarbon and the chlorine together. The exothermic heat of reaction is removed by suitable cooling methods. Sometimes it is helpful to use ultra-violet light as a catalyst for the reaction, but this is not absolutely necessary. Chlorination is continued over such time as is necessary, and always with violent agitation, so that each molecule can be conceived to have been subjected to the same degree of chlorination as the others in the mass. Chlorination is continued until a given viscosity, softening point, specific gravity, or chlorine content is reached. Either or all of these methods of tests may be employed, although quick tests, such as specific gravity or softening point, are usually preferred to the longer tests, such as percent chlorine, in controlling the reaction. The resultant product is now freed from hydrochloric acid gas by blowing with dry air; by subjecting to vacuum; or by a combination of the two.

Local overheating is avoided by heat exchange control during the process so as to circumvent decomposition. Temperatures used may vary over a wide range. Completion of reaction is a time-temperature function, and the higher the temperature which is used, the higher the rate of chlorination, provided that the temperature does not exceed the point where decomposition begins. Generally, the practical temperature limitations of these materials are between 80° C. and 125° C. As the chlorination proceeds, the viscosity increases, so it is desirable to maintain as high a temperature as possible towards the end of the reaction period, so as to achieve as high mobility and as high distribution of gas as possible. The product is preferably cooled immediately, as soon as the reaction is finished, to as low a temperature as possible and still permit it to be handled.

The particular chlorinated paraffinic material used in the above formula was produced as follows:

Crude petroleum wax, of approximately the composition $C_{20}H_{42}$, was melted, brought to a temperature of 80° C., and charged into a glass tank, equipped with a recirculating pump connected by pipe lines to the glass vessel. The pump caused the liquid to move at a high velocity to a pipe line, into which dry chlorine gas was introduced. Reaction, in part, was almost instantaneous, and the by-product hydrochloric acid gas, along with a relatively small amount of unreacted chlorine, was led over into a second or scrubbing reactor, and the gas from it in turn was led to a third, so that the exit gas was almost entirely hydrochloric acid gas.

In order to avoid foaming at certain points during the reaction period, a small amount of a volatile paraffinic hydrocarbon, having a boiling range of 400° to 500° F., was introduced into the system, and a reflux condenser was mounted on the exit of each chamber to condense any of this somewhat volatile hydrocarbon carried off by the hydrochloric acid gas. The action of the condensing vapor upon the viscosity of the foam layer, on top of the mass of chlorinating hydrocarbon, was successful in controlling the foam.

The temperature was allowed to rise to an average point of about 110° C., and was never allowed to exceed 125° C. by control of the exothermic heat generated. The reaction was continued for 30 hours, at the end of which time analysis revealed that the chlorine content was 58%; the ASTM ring and ball softening point was 42° C.; and the specific gravity was 1.38. The material was immediately cooled to room temperature, and was found to have a color of about 2 on the Barrett scale.

When the same material was made, and any local overheating was permitted, or the temperature was allowed to rise substantially above 125° C., the material was dark and, in some cases, almost ink black. This color is one indication of decomposition, and has a marked effect upon the properties of the product. If stored at an elevated temperature over a long period of time, or if hydraulic acid gas is not properly stripped, decomposition with an attendant darkening in color takes place. However, if it is desired to store the product at a higher temperature, it may be stabilized by the use of the usual heat stabilizers commonly used in stabilizing polyvinyl chloride, with or without the accompaniment of alkaline earth metals or alkaline earth carbonates. Whether or not the material is stored at elevated temperatures is purely a matter of individual preference and expediency. However, either before or at the time of the incorporation into the flooring batch, chlorinated paraffin, as well as the vinyl polymer, must be stabilized against decomposition. The amount of stabilizer to be incorporated depends a great deal upon the composition of the batch itself, and it is a well-known fact that if alkaline earth metal carbonates, such as calcium, magnesium, or a combination of the two, be used as a large portion of the filler, then the amount of other stabilizers required is diminished.

The above specified properties of the chlorinated paraffin, as well as the process for making it, may vary within quite wide limits. For instance, if the chrage stock used had been of an average composition of $C_{25}H_{62}$, the amount of chlorine required to bring it to a melting point of 42° C. would have been less, by about 4%, e.g., about 54% chlorine, and as a result, the specific gravity of the material would have been somewhat lower. Conversely, had the hydrocarbon charged stock been of the order of $C_{15}H_{32}$, 42° C. melting point would probably not be achievable within the range of practical chlorination. Likewise, 42° C. melting point is not a specific requirement, but either a lower or higher melting point chlorinated product may be used, dependent upon the type and amount of vinyl polymer with which it is to be associated, and depending upon the degree of hardness or softness desired in the finished product.

Vinyl copolymer

The vinyl copolymer used in the above example analyzed to show hydrogen chloride, acetic acid, hydrogen and carbon, corresponding to a composition of 13% vinyl acetate and 87% vinyl chloride. A 2% solution in cyclohexanone has a relative viscosity of 2.5, and should have a mold transparency spread, according to the below method, of 7.05 cm. to 9.0 cm. One method for preparing this type of resin is as follows:

| RECIPE | Parts by weight |
|---|---|
| Vinvy chloride monomer | 82.1 |
| Vinyl acetate monomer | 17.9 |
| Water | 220.0 |
| Lauroyl peroxide | 0.35 |
| Aerosol OT (sodium dioctyl sulfosuccinate) | 0.1 |
| Methocel (methyl cellulose) 1500 | 0.12 |
| Carbon tetrachloride | 1.0 |
| Trichlorethylene | 1.0 |

Lauroyl peroxide is the catalyst for polymerization. Aerosol OT (sodium dioctyl sulfosuccinate) and Methocel 1500 are emulsifying and suspending agents respectively. Carbon tetrachloride and trichlorethylene are "chain stoppers," by means of which the molecular weight of the product is controlled.

Method of procedure

Vinyl chloride monomer is first freed from any inhibitor (phenol or substituted phenol), by washing with caustic soda. It is then dried to free it from any caustic soda or sodium phenolate, preferably by distillation.

The water, lauroyl peroxide, Aerosol OT, Methocel 1500, carbon tetrachloride, trichlorethylene and vinyl acetate monomer are previously co-incorporated in an agitated charging tank. They are then transferred to an agitated glass-lined autoclave. The air space in the reactor is purged, and the vinyl chloride monomer introduced under pressure, from a "weigh by difference" pressurized weigh tank. Agitation is started and the temperature is gradually raised to 55° C. by means of a hot-water charging jacket on the autoclave. Pressure at this point builds up to slightly over 100 p.s.i. Reaction is maintained at this pressure until complete, as indicated by the falling pressure. When a pressure of 16 p.s.i. is reached, the reaction is terminated and the time required is 9 to 10 hours.

The vessel is vented and the liquid charge dropped into a receiving tank. The product is now dewatered and rinsed in a centrifuge, and dried at low temperature to produce a fine white powder.

The form of vinyl polymer is that of a rather finely comminuted powder. In order to obtain the particular properties desired in this particular instance, a ratio of 3.08 parts of the chlorinated hydrocarbon per part of vinyl polymer was used, and at this dilution of the vinyl resin, it is extremely important that substantially all of it be dissolved in, and be permanently and completely co-miscible with the chlorinated paraffin. Therefore, it is frequently desirable to associate the resin and the chlorinated hydrocarbon together, prior to incorporation with the rest of the flooring composition batch. This will depend, however, upon the time, temperature and degree of mixing employed in the mixing of the tile batch, and is not a pre-requisite, unless it be desired that the time of mixing of the ultimate batch be short.

Although I mention the particular way in which the resin in this particular case was made, and its particular characteristics, there are other recipes and procedures which may be used, within the scope of my limitations, to give the desired result; for instance, instead of the polymerization taking place in water suspension, it could be done in the presence of a liquid hydrocarbon, such as described in U.S. Patents Nos. 2,064,565 and 2,075,429. The ratio of chlorinated paraffin to vinyl polymer selected for this particular case is not rigid, and I have determined that ratios between 1.5 to 1, and 4 to 1, are practical to give the product within the scope of my claims. Specifically, I find that chlorinated paraffin should contain not less than 45% chlorine, nor more than 60%; that the charge stock shall preferably be in the range of $C_{18}H_{38}$ to $C_{30}H_{62}$; that the melting point should be not less than 15° C., or more than 55° C., and that the percent binder in the finished composition should be within the limits of 18.5% and 25% to produce tile to conform to Federal Specification SS-T-307, although there are possible an almost infinite number of combinations of charge stock; degree of chlorination; melting point of chlorinated paraffin; ratio of vinyl resin to chlorinated paraffin, of binder to filler, etc.

The properties of the vinyl polymer to be used may be determined principally by the following tests, within the limitations shown:

(a) Mold tranparency test_____ Method of Test #16, attached.
(b) Relative viscosity_____ Method of Test #17-1, attached.

An additional example of the number of variations which may be practiced within the scope of my invention is as follows:

EXAMPLE #II.—TILE, VINYL TYPE I

Paraffinic hydrocarbon, of approximately $C_{20}H_{42}$ average composition, was continuously chlorinated to a chlorine content of 52.5%; had a melting point of 15° C.; a specific gravity of 1.257; and a color of one (1) on the Barrett scale.

The average temperature of chlorination was 100° C., since it was not necessary to go to quite as high a temperature in this case as in the original case, because of the lower viscosity. The finished product was immediately degassed, and chilled to room temperature. In this case, the following tile formula was used:

| | |
|---|---:|
| Chlorinated Paraffin #2 | 11.840 |
| Vinyl Copolymer #2 | 7.900 |
| Polymerized rosin | .875 |
| Stabilizer [1] | .260 |
| Ground limestone | 46.125 |
| 7R Asbestos Fibre | 30.000 |
| Pigment | 3.000 |
| | 100.000 |

[1] Such as epoxy resin, barium cadmium laureate, barium ricinoleate, and others.

This tile gave the following test results when tested in accordance with Federal Specification SS-T-307, and with Federal Specification L-T-751 (Tile, Floor, Vinyl Plastic):

| | 1/8" Sample Specimen | SS-T-307 Requirements | 1/16" Sample Specimen | L-T-751 Requirements |
|---|---|---|---|---|
| One-minute penetration (mils) | 10.5 | 6.0 to 15.0 | 9.8 | 7.0 to 15.0. |
| Ten-minute penetration (mils) | 13.5 | | 13.0 | |
| Maximum allowed (mils) | 15.6 | 15.6 | 14.2 | 14.2. |
| Indentation at 115° F. (mils) | 22.5 | 36.0 | 19.5 | 35.0. |
| Residual Indentation | | | 3.0% | 5% Average. |
| Impact | O.K. | Shall not crack or break | O.K. | Shall not crack or break. |
| Deflection (Flexibility) | 2" | Not less than .4" | 3⅜" | Not less than .6". |
| Dimensional Stability | | | Less than .012" | Not more than .015"/lin. ft. |
| Curl | .015 | Not greater than .030 | .010 | Not greater than .030. |
| Volatile material | | | Less than 1% | Not greater 1.0%. |
| Oil and Alkali Resistance (Scratch width): | | | | |
| Control_____Inches | .055 | Not more than .170" | .055 | Not more than .120". |
| Lard_____do | .080 | _____do | .055 | Do. |
| Wesson Oil (hydrogenated cottonseed oil)_____do | .105 | _____do | .060 | Do. |
| Kerosene_____do | .115 | _____do | .070 | Do. |
| 2% Trisodium phosphate solution_____do | .100 | _____do | | |
| 5% NaOH_____do | | | .085 | Not more than .120". |
| Ethyl Alcohol_____do | | | .090 | Do. |
| Motor Oil_____do | | | .055 | Do. |
| 5% Soap_____do | | | .075 | Do. |
| Size_____do | 9"x9" | 8.992 to 9.008 | 9"x9" | ±.01125". |
| Thickness (Gauge)_____do | .125 | .120 to .130 | .0625 | ±0.005". |

Vinyl Polymer #2 consisted of ten parts of vinyl acetate and 90 parts of vinyl chloride, which were dissolved in normal hexane under pressure in the presence of 3% lauroyl peroxide, and polymerized under agitation at a pressure of 100 pounds per square inch, at a temperature of 50° C., with stringent agitation, in accordance with U.S. Patent No. 2,064,565. The resultant polymer had a composition of approximately 90% chloride and 10% acetate, and gave the following test results:

(a) Mold transparency test_____ 4.59 cm.
(b) Relative viscosity_____ 3.07 (2% solution).

Conclusions

The use of chlorinated paraffin in vinyl compositions is not new. However, its use in the proportions cited herein is distinctly new and novel. The recommendations of the commercial manufacturers of chlorinated paraffin all warn against its use in a greater quantity than 25% of the plasticizer content. The conventional product of commerce is 40% chlorinated paraffin, and when this product is used in any of the portions cited above, it does not make a homogeneous, permanently miscible combination; the chlorinated paraffin either failing to completely flux the vinyl resin in the first part, or exuding or sweating out of it upon cooling. Its use in vinyl compositions is recommended with strong solvent power plasticizers, such as the di-octyl alcohol ester of phthalic acid. This high solvent power plasticizer (D.O.P.) acts as a coupler between the low solvent power 40% chlorinated paraffin, and vinyl resin, when it is there to at least three parts DOP to one part chlorinated paraffin. When these portions are exceeded, and particularly when the currently commercial chlorinated paraffin is used along as the entire plasticizer component, the above-mentioned undesirable phenomena occurred.

In FIG. 1 there is diagrammatically illustrated apparatus for carrying out the paraffin chlorination. In FIG. 1, numeral 1 designates a reservoir of paraffinic hydrocarbon and % or partially chlorinated hydrocarbon. Numeral 1a designates a gas liquid separation zone of said reservoir. Numeral 2 designates a circulating pump. Numeral 3 designates a chlorine supply. Numeral 4 designates a heat exchanger. Numeral 5 designates a reflux condenser. Numeral 6 designates the spent gas efflux.

In the drawing there is shown two similar units 10, 10a. The spent gas efflux 6 of unit 10 is connected to pump 2 of the second unit. The second unit 10a acts as a scrubber to remove chlorine from the spent gas effluent from the first unit 10. Additional scrubbing units may be placed in series if desired. When chlorination has been completed in unit 10 the product is removed and the vessel 1 recharged with hydrocarbon. Raw chlorine may be introduced into unit 10a and then unit 10 becomes a scrubbing unit.

Molding test: Transparency

The area of transparency of a molded unplasticized vinyl copolymer, as calculated from a transparency gauge 15 (see FIG. 2), is a means of measurement devised to compare the flow or thermoplastic properties of the vinyl copolymer, and to obtain an indirect qualitative measurement of the processing behavior of the vinyl copolymer in a given vinyl-asbestos tile formulation.

Apparatus

1 Carver "Hot" molding press (see attached description)
1 Carver "Cold" molding press (see attached description)
2 Teflon .014 gauge sheets, 6" x 6".
2 Aluminum plates, 5 9/16" x 5 9/16" x 1/2"
1 Transparency gauge
1 Stopwatch
1 Torsion balance

Procedure (1) Weigh out 10 grams of the vinyl copolymer to be tested, and place in a small pile approximately 5 cm. in diameter on a .014 gauge 6" x 6" piece of Teflon (or equivalent type of coated fabric), which is supported by a flat 5 9/16" x 5 9/16" x 1/2" aluminum plate.

(2) Cover the vinyl copolymer with another sheet of Teflon and a 5 9/16" x 5 9/16" x 1/2" aluminum cover plate.

(3) The sandwich of the two aluminum plates, the two Teflon sheets, and the vinyl copolymer comprise the mold assembly.

(4) A Carver Laboratory Press, described as attached hereto, is heated electrically to 155° C. with the platens in contact with each other so as to assure uniform heating of both plates. When the temperature has risen to 155° C., the electricity is turned off; the press opened; and the mold assembly inserted.

(5) The press is then closed to contact pressure only and held for one minute.

(6) Pressure is raised to 2000 lbs./sq. in. on the outer scale, which reads the pounds per square inch on the 36 sq. in. platen.

(7) Release pressure and transfer to water-cooled cold press at 2000 lbs. per square inch pressure for two minutes.

(8) Release cold press pressure and remove vinyl film from mold.

(9) Measure the "Diametric Degree of Transparency"[1] with the Transparency Gauge[2] by placing the molded film on the gauge and reading the highest visible number or fraction thereof through the film at each of the numbered bisecting lines. The "Diametric Degree of Transparency" is the average transparency obtained from the eight readings of the transparency gauge.

Tolerance

A. INDIVIDUAL SHIPMENTS OF VINYL COPOLYMER

Two moldings shall be made from each individual shipment of vinyl copolymer under the above controlled conditions, and eight transparency readings for each molding shall be averaged. If the average numerical reading of the two moldings show a deviation of greater than ±2% from one another, other moldings shall be made until two show no greater deviation than ±2%. The irrelevant data is discarded.

CARVER LABORATORY PRESS

Manufacturer and supplier:
  Fred S. Carver, Inc.
  One Chatam Road
  Summit, New Jersey
  U.S.A.

Description of apparatus and operation

See Service Manual and General Instructions supplied by manufacturer.

The Carver Laboratory Press is supplied without the heating and cooling accessories. These items are ordered separately. The press proper has 6-inch square pressing faces between which a pressure of 20,000 lbs. can be easily generated by the hydraulic pump handle. The press is self-contained having its own oil pump, reservoir and gauge.

*Hot Plates (platens), Electric, for use with the Carver Laboratory Press.*—These platens are intended for plastic molding and hot pressing of various kinds. They are 6 inches square and are built to operate from a lamp socket. They provide any heat desired up to 204° C. Each platen is equipped with a thermometer well into which a thermometer can be inserted in order to determine the temperatures. The platens are supplied with thermoswitch, on-off switch, cord and plug, but without thermometer. The platens are supplied in either 115 volt A.C. or D.C., or 230 volt A.C. or D.C. Two

---

[1] Diametric degree of transparency: Since the chart is spaced in 1/2 cm. divisions, the direct reading gives a number twice that of the radial distance in cm. or the diametric value.
[2] Transparency gauge: A calibrated chart consisting of ten concentric circles spaced 0.5 centimeter apart and divided into eight equal sections, by eight radial lines spaced 45° apart. Each circle is numbered from the center out along each radial line for ease of measurement.

6" x 6" x 5/16" Transite boards and two steel wire mesh screens are supplied with the heat platens to separate and insulate them from the main frame of the press.

The cold press platens with provision for water-cooling may be obtained from the supplier.

RELATIVE VISCOSITY

The relative viscosity figure gives a means of comparing one resin with another. It provides a relative indication of the average molecular weight of the resin, the "hardness," or the softening temperature. All these values increase with increasing relative viscosity.

Apparatus (a) Ostwald-Fenske Pipette Viscometer, size 100, Fisher Cat. No. 13–616.
(b) Fisher Unitized Kinematic Viscosity Bath, Fisher Cat. No. 13–619–1.
(c) Water Bath Clamp, Fisher Cat. No. 15–445–80.
(d) 50 ml. Erlenmeyer Flask with glass stopper, Fisher Cat. No. 10–098.
(e) Stop watch.
(f) Analytical balance.
(g) Torsion balance.
(h) 50 ml. beaker.
(i) Fritter disk filtering funnel, Fisher Cat. No. 10–359–M50.
(j) Mechanical Shaker, Will Corp. Cat No. 23775T.
(k) Suction bulb with tube cork assembly for filling pipette.
(l) Acetone washed filter paper (coarse).

Procedure and calculations

Weigh a 1.0 gram sample of the vinyl copolymer resin to the nearest 0.5 milligram on a tared paper analytical balance.

Transfer the sample to a 50 cc. glass stoppered Erlenmeyer flask and weigh the flask plus resin on a torsion balance. Add 15 cc. of cyclohexanone slowly and gently swirling to prevent gel formation. Add cyclohexanone to bring the total cyclohexanone to 49 grams. Place on the mechanical shaker for 6 hours or until the resin is completely dissolved (undissolved gel particles can be detected when the flask is held up to a strong light). Remove the flask, filter the 2% solution through the acetone washed filter paper.

Determination of relative viscosity

Invert the small capillary tube of the Ostwald pipette into the filtered test solution and by means of the suction bulb assembly fill the tube to the calibration mark nearest to the large reservoir bulb of the pipette. Place the filled Ostwald pipette in an upright position in a 25° C. water bath, using care to insure that the capillary tube is vertical; the pipette is immersed above the upper calibration mark; and the bath temperature is correct within 0.1° C.

Allow test solution to stand in pipette for at least 10 minutes to reach equilibrium temperature. Suck the solvent into the small bulb above the capillary. Release the suction, and measure the time elapsed required for passage of the meniscus between the two calibration marks with a stop watch. Repeat the measurement until at least two checks (±5 seconds) are obtained.

After each sample is run, the pipette should be cleaned by rinsing with acetone, blowing with air, and drying at 80° C. for 10 minutes.

The relative viscosity is computed as follows:

$$\text{Relative viscosity} = \frac{\text{Solution efflux time}}{\text{Solvent efflux time}}$$

Precautions

A vacuum line or syringe bulb should be used for suction and in pipetting cyclohexanone and test solutions. Take great care to keep pipettes and solution flasks scrupulously clean and filter all cyclohexanone and resin test solutions through a clean fritter disc filter as viscosity measurements are very sensitive to contaminants and dirty equipment. If the regular cleaning procedure is not adequate, the pipettes and flasks may be cleaned readily in boiling cyclohexanone.

Having thus described certain embodiments of the invention, what is claimed is:

1. A grease resistant floor tile composed of (a) between about 18.5% and 25% of a solvent-soluble organic binder consisting essentially of (1) a chlorinated paraffin containing between about 45% and 60% of chlorine and having a melting point of about 15° C. to 55° C., and (2) a copolymer of about 87% to 90% vinyl chloride and 13% to 10% vinyl acetate, in the proportions of from about 1.5 to 4 parts by weight of the chlorinated paraffin to 1 part by weight of the copolymer; and (b) between about 81.5% and 75% of inorganic fillers.

2. A grease-resistant floor tile as defined in claim 1, in which the organic binder consists essentially of about 3 parts of (1) a chlorinated paraffin containing between about 54% and 58% chlorine and having a melting point of around 42° C., and (2) about 1 part of a copolymer of about 87% vinyl chloride and 13% vinyl acetate.

3. A grease-resistant floor tile as defined in claim 1, in which the organic binder consists essentially of (1) about 60% of a chlorinated paraffin of around 52.5% chlorine and having a melting point of around 15° C., and (2) about 40% of a copolymer of about 90% vinyl chloride and 10% vinyl acetate.

4. A grease-resistant floor tile as defined in claim 1, in which the inorganic fillers are mainly calcium carbonate admixed with asbestos.

5. A grease-resistant floor tile as defined in claim 1, made of the following ingredients in approximately the following proportions:

| Ingredient | Amount |
| --- | --- |
| Chlorinated paraffin | 14.890 |
| Vinyl copolymer | 4.850 |
| Polymerized rosin | .875 |
| Stabilizer | .260 |
| Ground limestone | 56.825 |
| Asbestos fiber | 19.300 |
| Pigment | 3.000 |
| | 100.000 |

6. A grease-resistant floor tile as defined in claim 1 containing the following ingredients in approximately the following proportions:

| Ingredient | Amount |
| --- | --- |
| Chlorinated paraffin | 11.840 |
| Vinyl copolymer | 7.900 |
| Polymerized rosin | .875 |
| Stabilizer | .260 |
| Ground limestone | 46.125 |
| Asbestos fiber | 30.000 |
| Pigment | 3.000 |
| | 100.000 |

7. A grease-proof composition adapted for use in making grease-resistant floor tile consisting essentially of (1) a chlorinated paraffin containing between about 45% and 60% of chlorine and having a melting point of about 15° to 55° C., and (2) a copolymer of vinyl chloride and vinyl acetate in the proportions of about 87% to 90% vinyl chloride and 13% to 10% vinyl acetate, in the proportions of about 1.5 to 4 parts by weight of the chlorinated paraffin to 1 part by weight of the copolymer.

8. A grease-proof composition as defined in claim 7 consisting essentially of (1) a chlorinated paraffin containing between about 54% and 58% of chlorine and having a melting point around 42° C., and (2) a copolymer of about 87% vinyl chloride and 13% vinyl acetate, in the proportions of about 3 parts by weight of the chlorinated paraffin to 1 part by weight of the copolymer.

9. A grease-proof composition as defined in claim 7, consisting essentially of (1) a chlorinated paraffin containing about 52.5% of chlorine and having a melting point of around 15° C., and (2) a copolymer of about 90% vinyl chloride and 10% vinyl acetate, in the proportions of about 60% of the chlorinated paraffin to 40% of the copolymer.

References Cited in the file of this patent

UNITED STATES PATENTS

| | | |
|---|---|---|
| 2,421,409 | Brookman et al. | June 3, 1947 |
| 2,428,282 | Kemmler | Sept. 30, 1947 |
| 2,436,216 | Leatherman | Feb. 17, 1948 |
| 2,453,052 | Van Etten | Nov. 2, 1948 |
| 2,563,593 | Engel | Aug. 7, 1951 |

FOREIGN PATENTS

| | | |
|---|---|---|
| 611,300 | Great Britain | Oct. 27, 1948 |
| 713,905 | Great Britain | Aug. 18, 1954 |

UNITED STATES PATENT OFFICE
CERTIFICATION OF CORRECTION

Patent No. 3,005,791                      October 24, 1961

John W. Church

It is hereby certified that error appears in the above numbered patent requiring correction and that the said Letters Patent should read as corrected below.

Column 2, line 68, for "produce" read -- product --; column 4, line 9, for "hydraulic" read -- hydrochloric --; line 32, for "$C_{25}H_{62}$" read -- $C_{25}H_{52}$ --; line 57, for "Vinv" read -- Vinyl --; column 7, line 35, for "and % or" read -- and/or --; column 9, line 36, after "paper" insert -- on an --.

Signed and sealed this 10th day of April 1962.

(SEAL)
Attest:

ERNEST W. SWIDER                          DAVID L. LADD
Attesting Officer                            Commissioner of Paten